US011915145B2

(12) United States Patent
Yoo et al.

(10) Patent No.: US 11,915,145 B2
(45) Date of Patent: Feb. 27, 2024

(54) LEVERAGING MULTIDIMENSIONAL SENSOR DATA FOR COMPUTATIONALLY EFFICIENT OBJECT DETECTION FOR AUTONOMOUS MACHINE APPLICATIONS

(71) Applicant: NVIDIA Corporation, Santa Clara, CA (US)

(72) Inventors: Innfarn Yoo, Fremont, CA (US); Rohit Taneja, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/883,055

(22) Filed: Aug. 8, 2022

(65) Prior Publication Data

US 2022/0383620 A1 Dec. 1, 2022

Related U.S. Application Data

(63) Continuation of application No. 16/818,860, filed on Mar. 13, 2020, now Pat. No. 11,468,582.

(Continued)

(51) Int. Cl.
*G06N 3/084* (2023.01)
*G06T 7/521* (2017.01)
(Continued)

(52) U.S. Cl.
CPC ............. *G06N 3/084* (2013.01); *G06N 3/045* (2023.01); *G06N 20/00* (2019.01); *G06T 7/30* (2017.01);
(Continued)

(58) Field of Classification Search
CPC .......... G06N 3/045; G06N 20/00; G06N 3/08; G06N 3/044; G06N 3/084; G06N 7/01;
(Continued)

(56) References Cited

U.S. PATENT DOCUMENTS 9,934,590 B1 * 4/2018 Cheng .................. G06V 10/435
10,013,773 B1 * 7/2018 Ogale .................... G06N 3/084
(Continued)

FOREIGN PATENT DOCUMENTS

WO 2018170472 A2 9/2018

OTHER PUBLICATIONS

Qi, Charles R., et al. "Frustum pointnets for 3d object detection from rgb-d data." Proceedings of the IEEE Conference on Computer Vision and Pattern Recognition. 2018. 15 Pages.
(Continued)

*Primary Examiner* — Ajibola A Akinyemi
(74) *Attorney, Agent, or Firm* — Taylor English Duma L.L.P.

(57) ABSTRACT

In various examples, a two-dimensional (2D) and three-dimensional (3D) deep neural network (DNN) is implemented to fuse 2D and 3D object detection results for classifying objects. For example, regions of interest (ROIs) and/or bounding shapes corresponding thereto may be determined using one or more region proposal networks (RPNs)—such as an image-based RPN and/or a depth-based RPN. Each ROI may be extended into a frustum in 3D world-space, and a point cloud may be filtered to include only points from within the frustum. The remaining points may be voxelated to generate a volume in 3D world space, and the volume may be applied to a 3D DNN to generate one or more vectors. The one or more vectors, in addition to one or more additional vectors generated using a 2D DNN processing image data, may be applied to a classifier network to generate a classification for an object.

20 Claims, 13 Drawing Sheets

Related U.S. Application Data

(60) Provisional application No. 62/819,547, filed on Mar. 16, 2019.

(51) Int. Cl.

| | | |
|---|---|---|
| *G06T 7/30* | (2017.01) | |
| *G06N 20/00* | (2019.01) | |
| *G06T 7/50* | (2017.01) | |
| *G06V 20/64* | (2022.01) | |
| *G06V 10/82* | (2022.01) | |
| *G06V 10/764* | (2022.01) | |
| *G06T 15/00* | (2011.01) | |
| *G06N 3/045* | (2023.01) | |
| *G06V 10/25* | (2022.01) | |
| *G06V 10/80* | (2022.01) | |
| *G06V 10/44* | (2022.01) | |
| *G06V 20/58* | (2022.01) | |

(52) U.S. Cl.
CPC ............... *G06T 7/50* (2017.01); *G06T 7/521* (2017.01); *G06T 15/00* (2013.01); *G06V 10/25* (2022.01); *G06V 10/454* (2022.01); *G06V 10/764* (2022.01); *G06V 10/80* (2022.01); *G06V 10/82* (2022.01); *G06V 20/58* (2022.01); *G06V 20/64* (2022.01); *G06T 2200/04* (2013.01); *G06T 2207/20084* (2013.01)

(58) Field of Classification Search
CPC  G06N 3/04; G06N 5/01; G06N 20/10; G06N 20/20; G06N 3/088; G06N 3/047; G06N 5/04; G06N 3/02; G06N 3/082; G06N 3/048; G06N 3/042; G06N 3/063; G06N 5/022; G06N 5/046; G06N 3/006; G06N 5/02; G06N 3/0418; G06N 5/041; G06N 3/0455; G06N 3/0464; G06N 3/049; G06N 3/06
USPC ........................................................ 382/154
See application file for complete search history.

(56) References Cited

U.S. PATENT DOCUMENTS

| | | | |
|---|---|---|---|
| 10,885,698 B2 | 1/2021 | Muthler et al. | |
| 1,146,858 A1 | 10/2022 | Yoo et al. | |
| 2020/0211243 A1* | 7/2020 | Ulusoy | G06T 11/60 |
| 2022/0050997 A1* | 2/2022 | Meier | G06V 10/82 |

OTHER PUBLICATIONS

Lin, Tsung-Yi, et al. "Feature pyramid networks for object detection." Proceedings of the IEEE conference on computer vision and pattern recognition. 2017. 10 Pages.

Zhou, Yin, and Oncel Tuzel. "Voxelnet: End-to-end learning for point cloud based 3d object detection." Proceedings of the IEEE Conference on Computer Vision and Pattern Recognition. 2018. 10 Pages.

Weng, Lilian. "Object Detection for Dummies Part 3: R-CNN Family." available at https://lilianweng.github.io/lil-log/2017/12/31/object-recognition-for-dummies-part-3.html (last visited Jan. 28, 2020). 12 Pages.

Ren, Shaoqing, et al. "Faster r-cnn: Towards real-time object detection with region proposal networks." Advances in neural information processing systems. 2015. 14 pages.

Girshick, Ross. "Fast r-cnn." Proceedings of the IEEE international conference on computer vision. 2015. 9 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles",National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

International Preliminary Report on Patentability received for PCT Application No. PCT/US2020/022788, dated Sep. 30, 2021, 12 pgs.

International Search Report and Written Opinion in International Application No. PCT.US2020/022788 dated Jul. 7, 2020.

Du, X., Ang, M.H., Karaman, S., & Rus, D. (May 2018). A general pipeline for 3d detection of vehicles. In 2018 IEEE International Conference on Robotics and Automation (ICRA) (pp. 3194-3200). IEEE.

Feng, D., Haase-Schutz, C., Rosenbaum, L., Hertlein, H., Glaeser, C., Timm, F., . . . & Dietmeyer, K. (2020). Deep multi-modal object detection and semantic segmentation for autonomous driving: Datasets, methods, and challenges. IEEE Transactions on Intelligent Transportation Systems.

\* cited by examiner

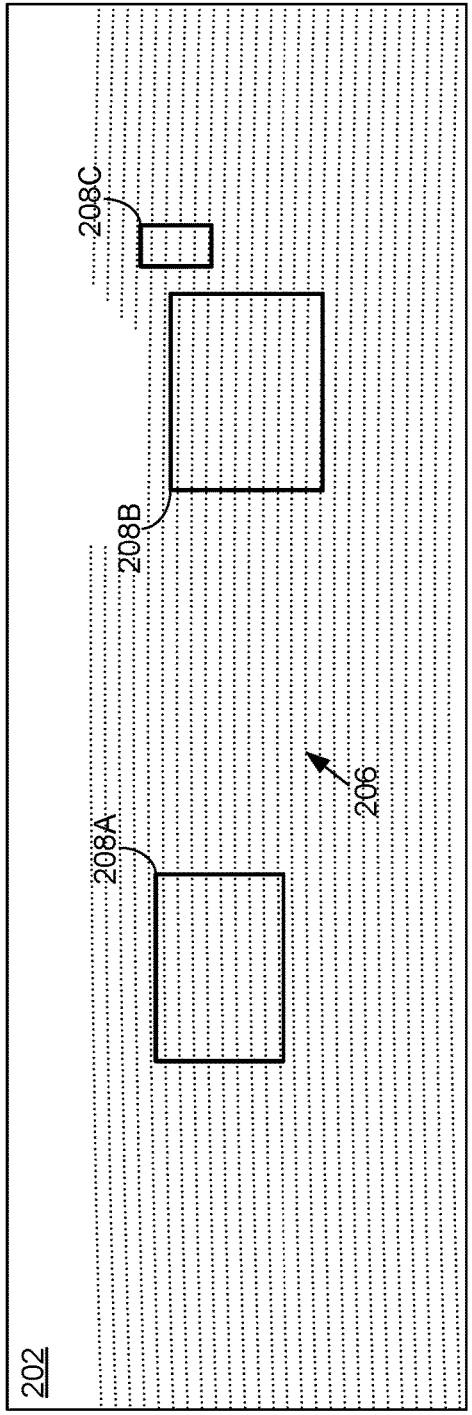
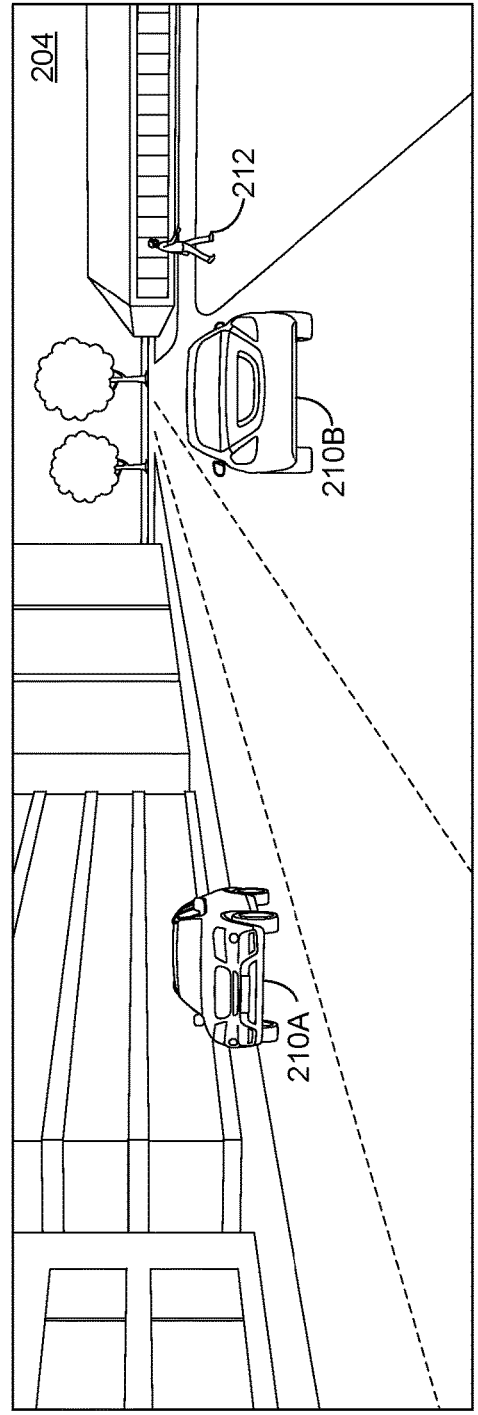
FIGURE 2

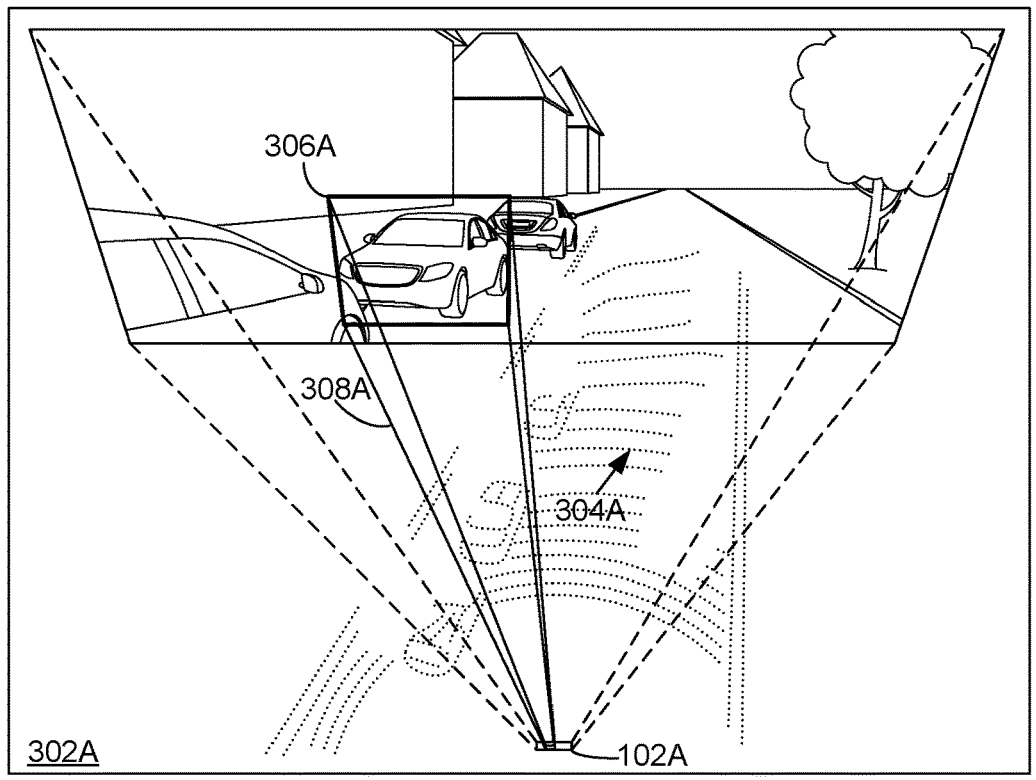
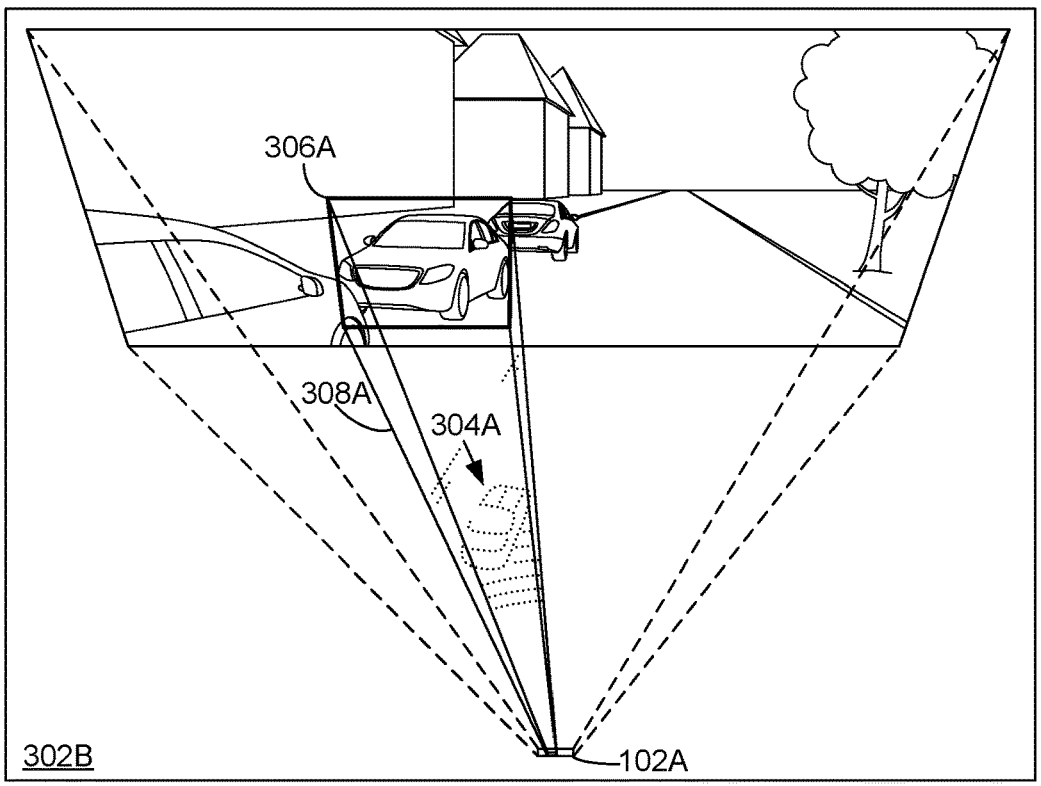
FIGURE 3A

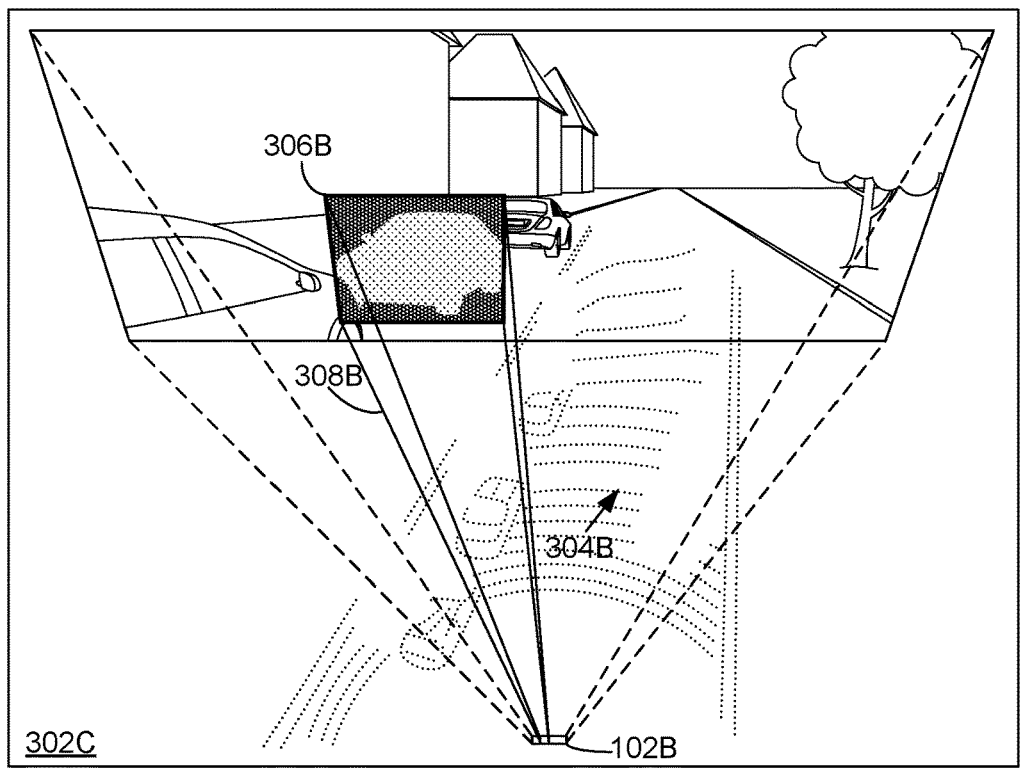
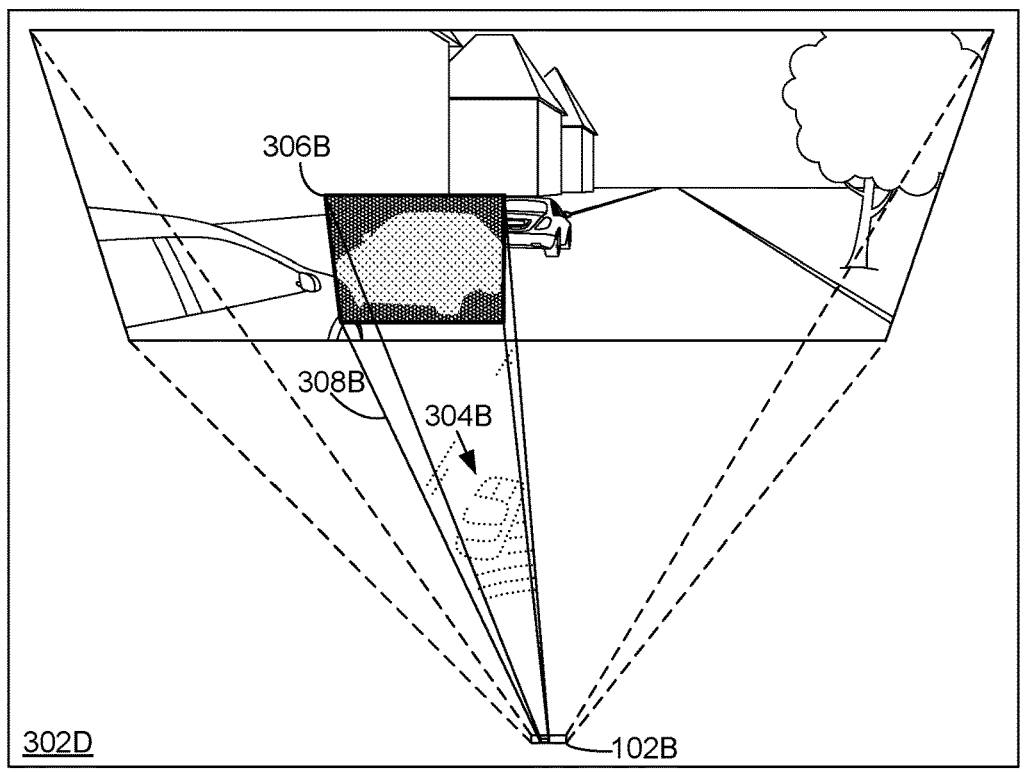
FIGURE 3B

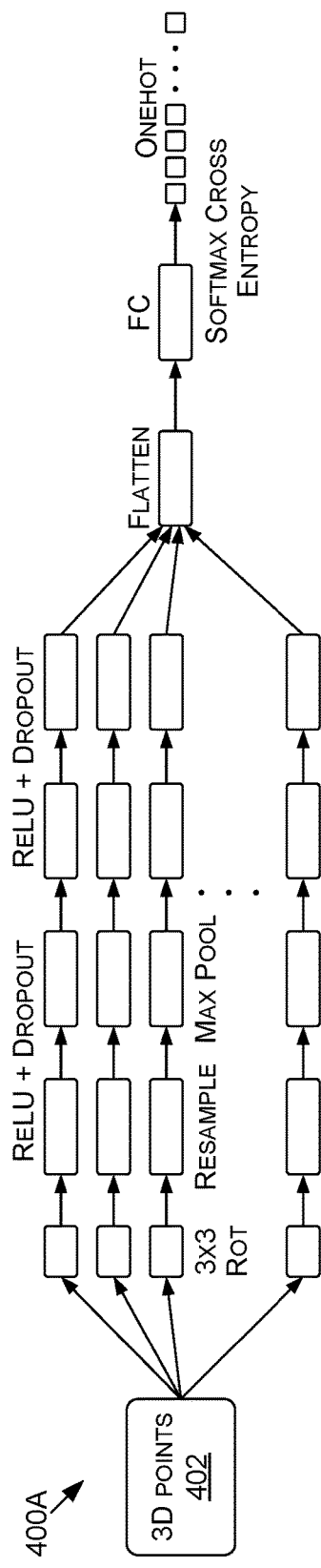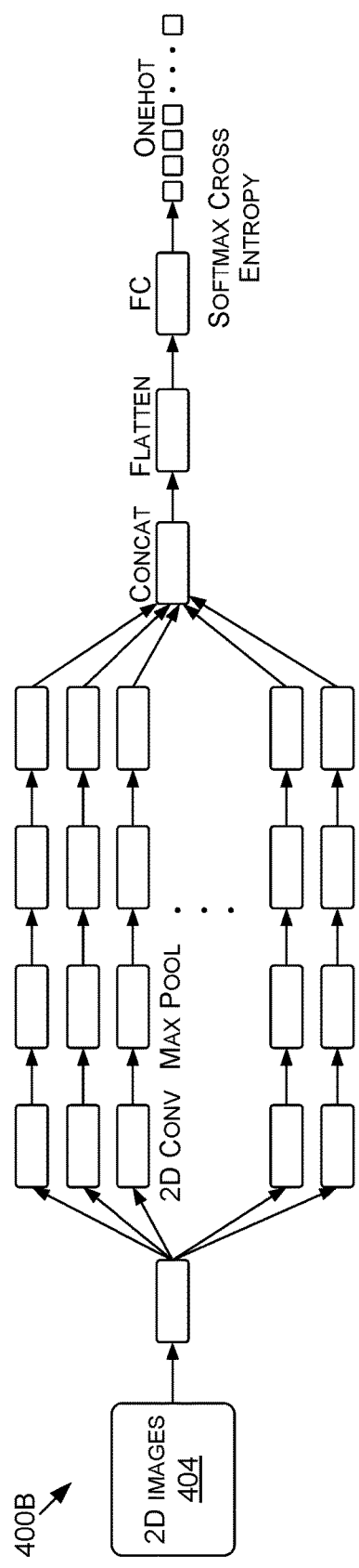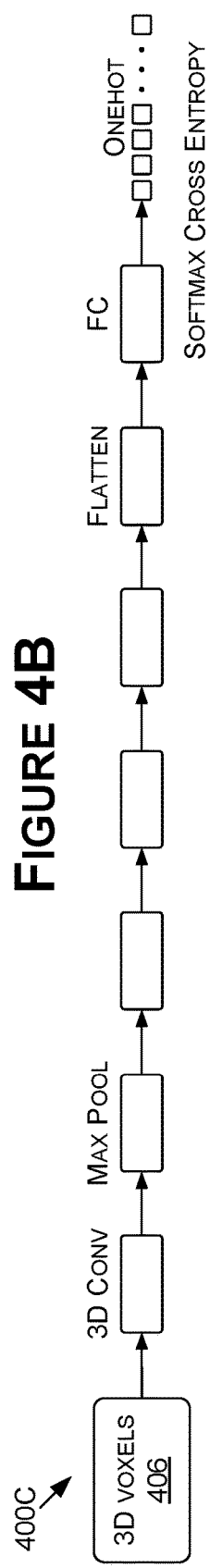
FIGURE 4A
FIGURE 4B
FIGURE 4C

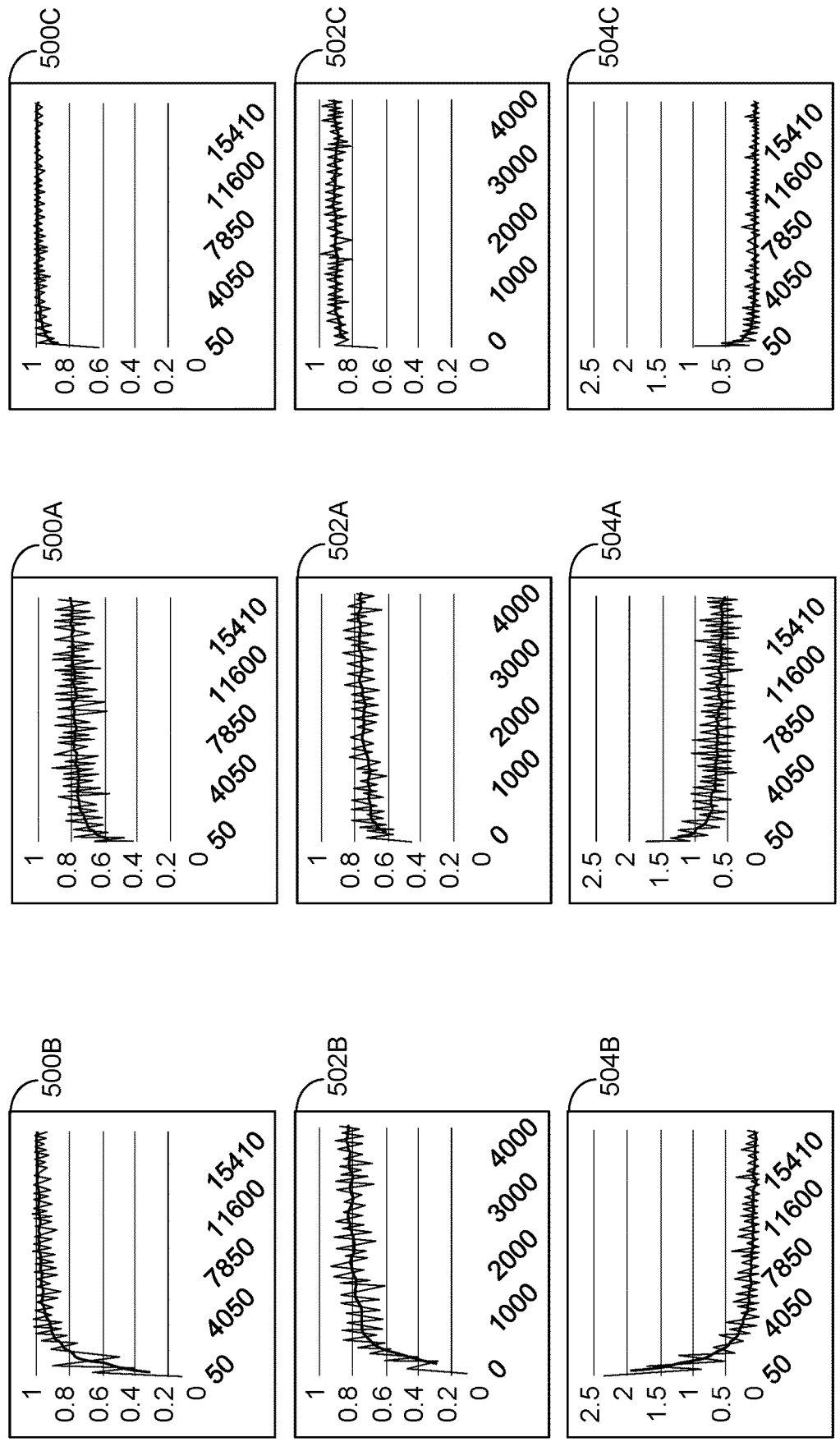

LEVERAGING MULTIDIMENSIONAL SENSOR DATA FOR COMPUTATIONALLY EFFICIENT OBJECT DETECTION FOR AUTONOMOUS MACHINE APPLICATIONS

CROSS-REFERENCE TO RELATED APPLICATIONS

This application is a Continuation of U.S. patent application Ser. No. 16/818,860, filed Mar. 13, 2020, which claims the benefit of U.S. Provisional Application No. 62/819,547, filed on Mar. 16, 2019. Each of these are hereby incorporated by reference in its entirety.

BACKGROUND

A demand for high resolution data with as much detail as possible has increased as the level of detail in source data required to satisfy safety standards for autonomous machines—such as vehicles and robots—has increased. For example, as the relative ease of capturing three-dimensional (3D) data has increased, the collection and use of 3D data in decision making for autonomous machines has likewise increased. However, 3D data also requires significantly more computing resources than two-dimensional (2D) data, and thus may increase the run-time of autonomous systems to such a degree that real-time or near real-time deployment is infeasible. Using object detection as an example, current approaches for performing object detection on 3D data—such as point clouds—have excessive computational costs and, by extension, contribute to excessive amounts of latency in the object detection processing pipeline. Even with the advent of state-of-the-art 3D point cloud processing techniques for object detection, the ability to implement these techniques into an autonomous system while maintaining real-time or near real-time operation has yet to be achieved.

In addition, even with the stringent safety requirements and standards for real-time inference tasks like autonomous driving—where there is no tolerance for false positives and false negatives—object detection has remained an approach limited to a single dimensional space (e.g., 2D only, 3D only, etc.). For example, some object detection methods use 2D data (e.g., images) while others use 3D data (e.g., LIDAR point clouds). However, without accounting for the unique challenges of each dimensional space, achieving safe autonomous operation of machines like robots and autonomous vehicles may be untenable.

SUMMARY

Embodiments of the present disclosure relate to leveraging multidimensional (e.g., two-dimensional (2D) and three-dimensional (3D)) sensor data for computationally efficient object detection. Systems and methods are disclosed that use two or more sensor data types—such as image data and LIDAR data, for example—to compute object detections and classifications for the same.

In contrast to conventional systems, such as those described above, the present approach to object detection in autonomous machines incurs comparatively less computational cost with less latency, without sacrificing accuracy. For example, by using information from both 2D and 3D spaces both for training a deep neural network (DNN) as well as in deployment of the DNN, drawbacks of data in the different dimensional spaces may be overcome—e.g., where a sensor for one dimensional space fails, the DNN may still make accurate object detections on the data from a sensor from the other dimensional space. In addition, where data from two or more dimensional spaces is available to the DNN, the predictions of the DNN may result from fusing the multidimensional data to generate a final prediction—thereby inherently accounting for drawbacks of any single dimensional space.

To reduce compute resources, 2D data may be leveraged to generate regions of interest (ROIs), and the ROIs may be leveraged to filter out portions of 3D data—e.g., a 3D point cloud—that do not correspond to the ROIs. For example, for a single ROI, a frustum may be generated from the 3D sensor to the ROI within 3D space, and the 3D data outside of the frustum may be filtered out or ignored. As a result, 3D object detection may be performed only on the 3D data within the frustum, 2D object detection may be performed on the 2D data, and the computations for both may be concatenated or otherwise fused to determine a final object detection. By leveraging both 2D and 3D data, false positives and false negatives may be minimized, while the filtering of the 3D data may reduce latency and run-time—thereby enabling the object detection process to execute in real-time or near real-time with a level of accuracy suitable for autonomous machine operations.

BRIEF DESCRIPTION OF THE DRAWINGS

The present systems and methods for leveraging multidimensional sensor data for computationally efficient object detection are described in detail below with reference to the attached drawing figures, wherein:

FIG. 2 is an example illustration of generating regions of interest from sensor data generated by a depth sensor(s), in accordance with some embodiments of the present disclosure;

FIGS. 3A-3C are example illustrations of filtering three-dimensional (3D) data by leveraging regions of interest computed using two-dimensional (2D) data, in accordance with some embodiments of the present disclosure;

FIGS. 4A-4C depict example network architectures for performing object detection using varying types of input data, in accordance with some embodiments of the present disclosure;

FIGS. 5A-5C include charts corresponding to performance characteristics of the network architectures of FIGS. 4A-4C, respectively, in accordance with some embodiments of the present disclosure;

DETAILED DESCRIPTION

Systems and methods are disclosed related to leveraging multidimensional (e.g., two-dimensional (2D) and three-dimensional (3D)) sensor data for computationally efficient object detection. Although the present disclosure may be described with respect to an example autonomous vehicle 700 (alternatively referred to herein as "vehicle 700", "ego-vehicle 700", or "autonomous vehicle 700," an example of which is described with respect to FIGS. 7A-7D, this is not intended to be limiting. For example, the systems and methods described herein may be used by, without limitation, non-autonomous vehicles, semi-autonomous vehicles (e.g., in one or more advanced driver assistance systems (ADAS)), robots, warehouse robots or vehicles, off-road vehicles, flying vessels, boats, shuttles, emergency response vehicles, motorcycles, electric or motorized bicycles, aircraft, construction vehicles, underwater craft, drones, medical or surgical assistance machines, and/or other vehicle or robot types. In addition, although the present disclosure may be described with respect to autonomous driving or ADAS systems, this is not intended to be limiting. For example, the systems and methods described herein may be used in simulation environment (e.g., to test accuracy of machine learning models for object detection during simulation), in robotics (e.g., for object detection within environments of robots), aerial systems, boating systems, and/or other technology areas where object detection may be employed.

Object Detection and Classification System

Figure 1:
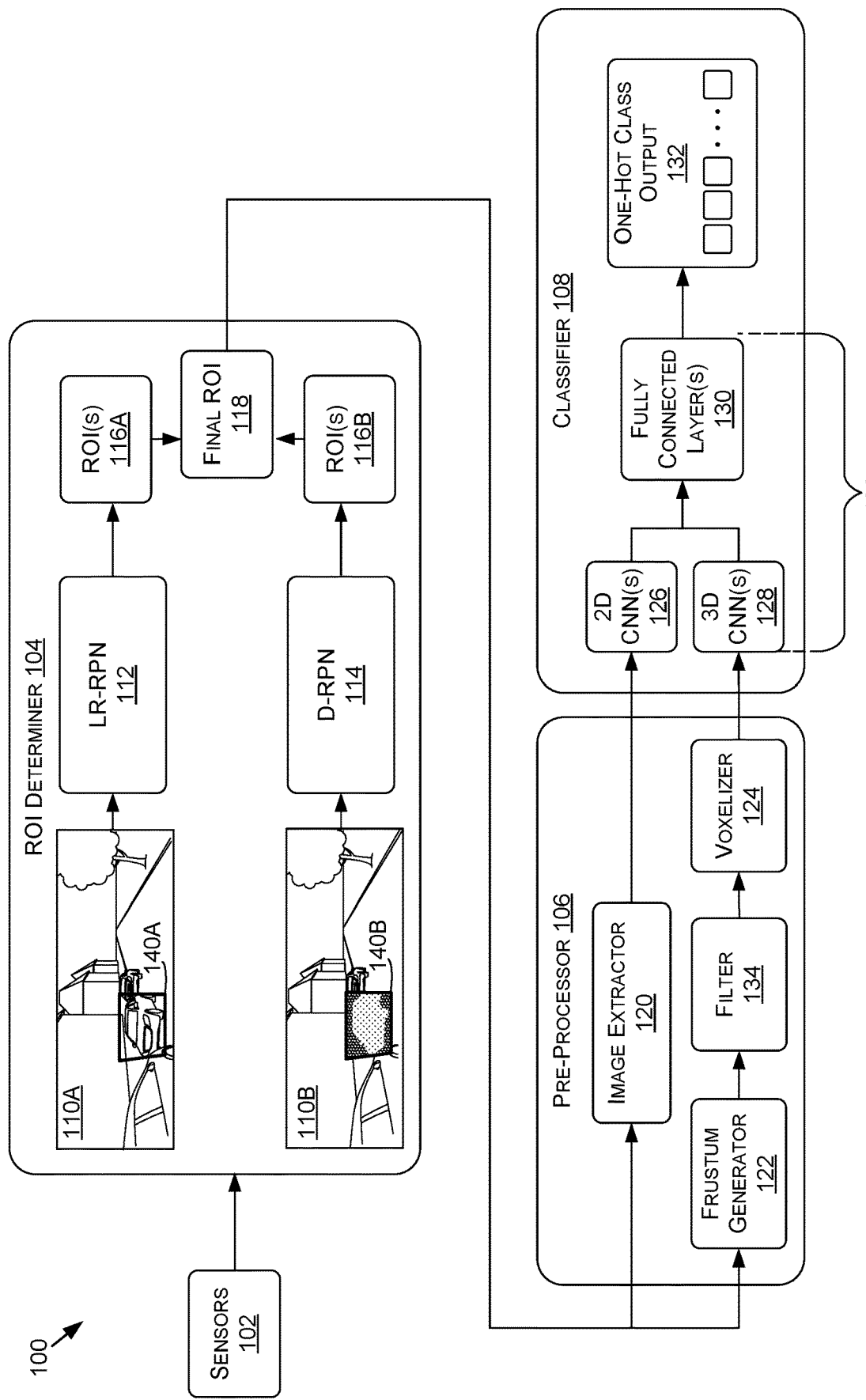
FIG. 1 depicts a block diagram of a system for performing object detection using multidimensional data, in accordance with some embodiments of the present disclosure.

Now referring to FIG. 1, FIG. 1 depicts a block diagram of a system 100 (alternatively referred to herein as an "object detection system 100," an "object classification system 100," or an "object detection and classification system 100") for performing object detection and/or classification using multidimensional data, in accordance with some embodiments of the present disclosure. The arrangements of the system 100 described herein are set forth only as examples. However, other arrangements and elements (e.g., machines, interfaces, functions, orders, groupings of functions, etc.) may be used in addition to or instead of those shown, and some elements may be omitted altogether, without departing from the scope of the present disclosure. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the object detection system 100 may use multidimensional data as inputs to a fusion neural network to generate region proposals and to classify objects. For example, one or more machine learning models may use images (e.g., low resolution images, depth only images, etc.) to generate region proposals in image-space. The region proposals may be used to generate frustums in world-space corresponding to the region proposals, and the frustum may be used to filter out portions—e.g., points of point clouds—of depth data that does not correspond to an area within the frustum in world-space. For each frustum, the remaining depth data—e.g., the remaining points of the point cloud—within the frustum may be voxelized to generate a volume in world-space. This volume may then be represented as an input tensor which may be applied to a three-dimensional (3D) convolutional neural network (CNN)—such as a 3D voxel-based CNN—and the 3D CNN may generate predictions corresponding to a classification of an object(s). In addition, two-dimensional (2D) image data—such as the image data used to generate the region proposals—may be applied to a 2D CNN to generate predictions corresponding to the classification of the object(s). The predictions of the 2D CNN and the 3D CNN may be combined—e.g., using one or more fully connected layers—to generate a final classification prediction corresponding to the object(s). As a result, the system 100 may generate object detection predictions as well as classification predictions using a combination of 2D and 3D data, thereby increasing accuracy of the predictions with respect to using data from a single dimensional space. Further, by leveraging the 2D data to filter out the 3D data not corresponding to an object, processing of the 3D data may be expedited, and overall compute may be reduced while simultaneously reducing runtime—enabling the system 100 to be implemented in real-time or near real-time applications where low-latency, accurate predictions are vital to safe operation.

The system 100 may include sensors 102 that may generate multidimensional data (e.g., one-dimensional (1D), 2D, 3D, etc.). For example, one or more sensors 102 may generate data in a first dimensional space, such as 2D, and one or more sensors 102 may generate data in a second dimensional space, such as 3D. The sensor data may include, without limitation, sensor data from any of the sensors 102 of the vehicle 700 (and/or other vehicles or objects, such as robotic devices, VR systems, AR systems, etc., in some examples). For example, and with reference to FIGS. 7A-7C, the sensor data may include the data generated by, without limitation, RADAR sensor(s) 760, ultrasonic sensor(s) 762, LIDAR sensor(s) 764, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, and/or other sensor types. For example, although reference is primarily made to the sensors 102 including cameras and depth sensors (e.g., LIDAR sensors 764, RADAR sensors 760, etc.), this is not intended to be limiting, and the sensors 102 may alternatively or additionally be generated by any of the sensors of the vehicle 700, another vehicle, an object, a machine (e.g., a robot), and/or another system (e.g., a virtual vehicle in a simulated environment, a traffic system, a surveillance system, etc.).

In some examples, the sensor data may be generated by one or more forward-facing sensors, side-view sensors, and/or rear-view sensors of the vehicle 700 and/or other machine type. This sensor data may be useful for identifying, detecting, classifying, and/or tracking movement of objects around the vehicle 700 and/or other machines within the environment. In embodiments, any number of sensors 102 may be used to incorporate multiple fields of view (e.g., the fields of view of the long-range cameras 798, the forward-facing stereo camera 768, and/or the forward facing wide-view camera 770 of FIG. 7B) and/or sensory fields (e.g., of a LIDAR sensor 1464, a RADAR sensor 1460, etc.).

The sensor data from the one or more sensors 102 may be applied to a region of interest (ROI) determiner 104. The ROI determiner 104 may leverage one or more machine learning models—such as deep neural networks (DNNs)—to compute locations of ROIs corresponding to instantiations of sensor data representative of a field of view(s) and/or a sensor field(s) of the one or more sensors 102. For example, the ROI determiner 104 may leverage a low-resolution (LR) region proposal network (RPN) 112 (collectively referred to as an LR-RPN 112) to generate one or more ROIs 116A. The LR-RPN 112 may include a DNN trained to predict—from 2D data, such as image data—locations of the ROI(s) 116A. For example, the LR-RPN 112 may take as input image data representative of one or more images—such as an image represented in visualization 110A of FIG. 1. Although a bounding shape 140A is illustrated in the visualization 110A, this is for illustrative purposes only, and represents one of the ROIs 116A as computed by the LR-RPN 112 that corresponds to the image represented in the visualization 110A. In some non-limiting embodiments, the image data may be captured at a first resolution, and may be downsampled to a lower resolution prior to being applied to the LR-RPN 112. This downsampling may reduce latency and runtime which is critical for safe operation in real-time or near real-time tasks—such as object detection tasks for autonomous driving applications.

As such, the inputs to the LR-RPN 112 may include image data representing an image(s) and/or image data representing a video (e.g., snapshots of video). Where the sensor data includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data may be used by the system 100 without any pre-processing (e.g., in a raw or captured format), while in other examples, the sensor data may undergo pre-processing (e.g., noise balancing, demosaicing, scaling, cropping, augmentation, white balancing, tone curve adjustment, etc.), such as using a sensor data pre-processor (not shown). As used herein, the sensor data may reference unprocessed sensor data, pre-processed sensor data, or a combination thereof.

The LR-RPN 112 may be trained to compute confidences or probabilities with respect to the existence and location of a foreground object, without performing classification to get a final class probability. In some embodiments, the LR-RPN 112 may include only convolutional layers to reduce processing time—as compared to selective search methods, for example—in generating the region proposals. In some embodiments, the convolutional layers may be pre-trained—e.g., on another data set—to reduce the compute resources for training specific to the LR-RPN 112. The LR-RPN 112 may generate predictions of bounding shapes (e.g., squares, rectangles, boxes, circles, polygons, etc.) that fit to object(s) represented in the image data using a set of anchor boxes. The LR-RPN 112 may, in some embodiments, use RPN loss which may be the sum of classification loss and bounding shape regression loss. For classification loss, in some embodiments, cross entropy loss may be used to penalize incorrectly classified bounding shapes. The bounding shape regression loss may be a function of distance between ground truth regression coefficients and regression coefficients of predictions of the LR-RPN 112. To identify foreground and background anchors, an output of an internal layer(s) of the LR-RPN 112 may be applied to one or more convolutional layers (e.g., two (1, 1) kernel convolutional layers) to produce background class and foreground class scores along with probabilities. Based on the RPN loss, anchors may be selected in order to train the LR-RPN 112 towards distinguishing between foreground and background regions, as well as training the LR-RPN 112 to predict regression coefficients for foreground bounding shapes. Anchor generation over an input image is the starting point for the LR-RPN 112, and choosing an aspect ratio, scales, and anchor strides is crucial to achieving high accuracy—especially where the image data may be downsampled, and thus less dense, to decrease latency. As a non-limiting example, and after extensive experimentation, accurate and low-latency results have been achieved using scales of [0.25, 0.5, 1.0, 1.5, 2.0] and aspect ratios of [0.5, 1.0, 2.0]. However, any scales, aspect ratios, and/or anchor strides may be used without departing from the scope of the present disclosure.

In deployment, the LR-RPN 112 may extract feature representations from 2D images (e.g., from image data representative thereof) and may use the feature representations to generate region proposals (e.g., ROIs 116A). For every anchor permutation over a feature representation, the LR-RPN 112 may generate a dense grid of proposed regions. As a result, to filter the proposed regions (or ROIs 116A), non-maximum suppression (NMS) may be executed on the list of region proposals to refine the proposed regions further by removing some or all of the overlapping region proposals. After applying NMS, some number of the remaining region proposals may be maintained. For non-limiting examples, one-hundred, two-hundred, three-hundred, and/or another number of region proposals may be maintained by implementing an intersection over union (IoU) technique. For a non-limiting example, an IoU of 0.5, 0.6, 0.7, 0.8, and/or another value may be used. As such, by using the IoU, the region proposals may be further filtered to generate the ROIs 116A that may be used directly as final ROI(s) 118—or combined with the ROIs 116B to generate the final ROI(s) 118—that may be applied to a pre-processor 106.

As another example, the ROI determiner 104 may leverage a depth-based region proposal network (RPN) 114 (collectively referred to as a D-RPN 114) to generate one or more ROIs 116B. The D-RPN 114 may include a DNN trained to predict—from 2D and/or 3D data, such as LIDAR data, RADAR data, and/or depth data from other depth sensor types—locations of the ROI(s) 116B. For example, the D-RPN 114 may take as input sensor data representative of one or more point clouds or other depth information representations, as represented within a bounding shape 140B of visualization 110B. Although the bounding shape 140B is illustrated in the visualization 110B, this is for illustrative purposes only, and represents one of the ROIs 116B as computed by the D-RPN 114 that corresponds to the depth data represented in the visualization 110A. In addition, although the depth data—e.g., the point cloud—is only represented within the bounding shape 140B, this is for illustrative purposes only. For example, and as further illustrated in FIG. 2, the ROIs 116B may be computed by the D-RPN 114 using a point cloud corresponding to a larger portion of the environment within a sensory field or field of view of one or more depth sensors.

As such, the inputs to the D-RPN 114 may include 2D and/or 3D sensor data generated from one or more depth sensors as projected into 2D image space. For example, the 2D and/or 3D sensor data may be projected into an image to generate an input depth image for the D-RPN 114. The input depth image may include pixel values for each pixel that correspond to distances to objects and/or other portions of the environment represented by the pixel. For example, conversions between world-space locations and corresponding image-space locations of LIDAR data, RADAR data, and/or other depth data may be known, or determined, using intrinsic and/or extrinsic parameters—e.g., after calibration—of the LIDAR sensor(s) 765, the RADAR sensor(s) 760, other depth sensor types, and/or the camera(s) that generated the image. As such, because this relationship between world-space and image-space is known, and because the depth data and the image data may have been captured substantially simultaneously, the depth data distance predictions may be associated with the various objects—or their corresponding bounding shapes—in the input depth image. As such, the input depth image may be alternatively referred to herein as a depth map.

As an example, and with respect to FIG. 2, depth data from one or more depth sensors may be used to generate a point cloud 206, and the depth values as determined from the point cloud may be applied to an image—e.g., an image 204—to generate a depth map (e.g., as illustrated in visualization 202). The depth map may include pixel values for pixels that correspond to an associated depth of objects or features of the environment. As such, the depth map—which represents the point cloud 206 applied to image-space—may be applied to the D-RPN 114, and the D-RPN 114 may generate one or more region proposals 208A, 208B, and 208C (e.g., ROIs 116B) that correspond to a vehicle 210A, a vehicle 210B, and a pedestrian 212, respectively.

The D-RPN 114 may be trained similarly to the LR-RPN 112, in some embodiments. However, the D-RPN 114 may use small and shallow convolutional layers—which may not be pre-trained. In a non-limiting example, the final convolutional layer of D-RPN 114 may have a dimension of [10, 37, 100] corresponding to height, width, and number of features, respectively. The last convolutional layers may be resized to two or more smaller layers—e.g., layers of [4, 18, 100] and [1, 4, 100]—and then the width and height may be combined to end up with [370, 100], [72, 100], and [4, 100]. These three layers may be combined into a single layer of width and height [450, 100], where the first element of dimension indicates a region and the second element of dimension indicates a feature vector. Example non-limiting scale factors may be [0.5, 1.0, 1.5] and aspect ratios [0.5, 1.0, 2.0]. Similar to LR-RPN 112, D-RPN may use anchor boxes during training. As a non-limiting example, nine anchor boxes per region may be used to generate an image of 4050 anchor boxes. Unlike LR-RPN 112, however, D-RPN may include only a single channel as input—e.g., the depth value. During training, IoU may be used for the positive class values and/or IoU may be used for the negative class values In deployment, the input depth image—or depth map—may be applied to the D-RPN 114, and the D-RPN may generate the ROIs 116B. An advantage of using the D-RPN 114—or another DNN or model in addition to the LR-RPN 112—is that region proposals may still be generated even where the camera(s) is not performing well. For example, where the camera(s) is looking directly into the sun, the environment suddenly goes dark (e.g., entering in a tunnel), the camera exits a dark location into light (e.g., exiting tunnel), and/or during evening hours where ambient light levels are low, the camera(s) may not perform as well as desired. As a result, to avoid inaccurate predictions from at least partially or momentarily compromised image data, the D-RPN 114—or another network or model—may be used as a secondary source of region proposals to increase the robustness, efficacy, and accuracy of the system 100.

In some examples, the ROIs 116B may be used directly as the final ROIs 118, or may be used in combination with the ROIs 116A to generate the final ROIs 118. As such, the ROIs 116A, the ROIs 116B, ROIs generated from one or more other methods (e.g., one or more other region proposal networks or models, using 1D, 2D, 3D, and/or other data types), or a combination thereof may be used to generate the final ROIs 118.

Where two or more ROI input paths—such as the LP-RPN 112 and the D-RPN 114—are used to generate the final ROIs 118, the multiple inputs may be compared to determine the final ROIs 118. For example, where the ROIs 116A and the ROIs 116B do not overlap—or do not overlap beyond a certain threshold, such as determined using IoU—the combination of the ROIs 116A and the ROIs 116B may be passed through as the final ROIs 118. Where at least one ROI 116A and at least one ROI 116B overlap—e.g., beyond a certain threshold amount—filtering, weighting, and/or other post-processing may be performed to determine the final ROIs 118. For example, NMS may be used to determine the final ROIs 118 from the combined ROIs 116A and 116B, weighting may be used (e.g., to give more weight to the ROIs 116A than the ROIs 116B, or vice versa), and/or other methods may be performed, such as averaging.

The final ROIs 118 (which may be determined using the ROI(s) 116A, ROI(s) 116B, and/or other ROI(s) from one or more other ROI proposal networks or machine learning models) may be used by the pre-processor 106 for two or more dimensional space pathways. For example, the pre-processor 106 may use the final ROI(s) 118 for a 2D data pipeline (e.g., via an image extractor 120 and/or 2D CNN(s) 126) and/or for a 3D pipeline (e.g., via a frustum generator 122, a filter 134, a voxelizer 124, and/or 3D CNN(s) 128). Although two data pipelines are illustrated in the system 100, this is not intended to be limiting, and any number of data pipelines may be used. For example, data pipelines for 1D, 2D, 3D, 4D, and/or other data types may be implemented within the system 100 without departing from the scope of the present disclosure. In any example, the outputs from the various data pipelines may be concatenation, joined, or otherwise combined to perform classification by a classifier 108, as described in more detail herein.

With respect to a 2D data pipeline, the pre-processor 106 may apply an image extractor 120 to some or all of the sensor data (e.g., image data, sensor data representing a depth map, etc.) corresponding to at least the final ROI(s) 118 to extract an image(s)—e.g., a vector or tensor representative thereof for applying to the 2D CNN(s) 126. For example, the image extractor 120 may generate an input vector from at least a portion of the sensor data corresponding to the final ROI(s) 118—which may include the image data that is applied to the LR-RPN 112, the sensor data corresponding to the depth map applied to the D-RPN 114, and/or other sensor data. For example, at least the portion of the sensor data corresponding to the final ROI 118 may be extracted by the image extractor 120. In some non-limiting embodiments, sensor data corresponding to more of an image, depth map, or other sensor data representation than the portion of the image within the final ROI 118 may be extracted by the image extractor 120—e.g., the entire image, some portion of the image greater than the portion corresponding to the final ROI 118, the entire depth map, a portion of the depth map greater than the portion corresponding to the final ROI 118, etc. In some examples, the portion of the sensor data to be extracted (e.g., the portion of the image data corresponding to the final ROI 118, the portion of the image data corresponding to more than the final ROI 118, the portion of the depth map corresponding to the final ROI, etc.) may be used to generate an ROI image (e.g., a vector, a tensor, and/or data representative thereof) that represents at least the portion of the sensor data corresponding to the final ROI 118. To generate consistent input spatial resolutions for the vector, tensor, and/or other data input type for the 2D CNN(s) 126, the ROI images may be extracted or generated at a fixed resolution (e.g., without limitation, 48×48, 64×64, etc.). As such, pixels from the sensor data corresponding to the final ROI(s) 118 may be extracted by the image extractor 120 and resized—where necessary—to generate the ROI image. This process may be performed for each final ROI 118, for groups of final ROIs 118, or for all ROIs 118 at once. For example, data representative of a single ROI image may be applied to the 2D CNN(s) 126, or data representative of two or more ROI images may be applied to the 2D CNN(s) 126, depending on the embodiment.

With respect to a 3D data pipeline, the pre-processor 106 may apply the final ROI(s) 118 to the frustum generator 122, the filter 134, and/or the voxelizer 124 to generate an input data type (e.g., vector, tensor, or other 3D data input representation) for the 3D CNN(s) 128. The frustum generator 122 may use the final ROI(s) 118—represented in 2D image-space—and extend a frustum into 3D world-space using calibrated camera parameters. For example, for a given final ROI 118, the bounding shape corresponding to the final ROI 118 may be projected into 3D world-space toward the location of the sensor 102 in 3D world-space to generate a frustum. This may include un-projecting the bounding shape defining the final ROI 118 using an inverse of a camera matrix—or other sensor type matrix. Similar to described above with respect to the 2D data pipeline, in some non-limiting embodiments, the frustum generator 122 may use the ROI image—e.g., a fixed resolution ROI image—to generate the frustum with respect to. In other embodiments, however, the frustum generator 122 may use the original spatial resolution of the sensor data without first resizing to a fixed resolution. In any embodiment, 3D world-space locations of an edge(s) of the final ROI(s) 118 (e.g., a top edge, left edge, right edge, and bottom edge, where the final ROI(s) 118 is four-sided) may define a distal extent of the frustum, and the location of the sensor 102 may define the proximal extent of the frustum.

As an example, and with respect to FIG. 3A, a frustum 308A may be generated to extend from a bounding shape 306A (which may correspond to a final ROI 118) to a sensor 102A in 3D world-space. In visualizations 302A-302B, the sensor 102A may include a camera(s) capturing image data, and the bounding shape 306A may be computed using the LR-RPN 112, for example. In the visualizations 302A-302B of FIG. 3A, the frustum 308A may extend from the four corners of the bounding shape 306A to a point on the sensor 102A—e.g., to a center of the sensor 102A, to edges of a lens of the sensor 102A, etc. In embodiments where the final ROI 118 is not four-sided (e.g., not a square, rectangle, box, etc.), the frustum 308A may extend from other portions of the final ROI 118—e.g., from equally spaced locations along a circle (e.g., from a point every 90 degrees), from vertices of a triangle, from vertices of a polygon, etc. The frustum 308A may thus define an area in 3D world-space (e.g., an area in the environment) that corresponds to the bounding shape 306A, as determined from the 2D image-space location of the bounding shape 306A.

Similarly, and with respect to FIG. 3B, a frustum 308B may be generated to extend from a bounding shape 306B (which may correspond to a final ROI 118) to a sensor 102B in 3D world-space. In visualizations 302C-302D, the sensor 102B may include a depth sensor(s) (e.g., a LIDAR sensor(s) 764, an ultrasonic sensor(s) 762, a RADAR sensor(s) 760, etc.) capturing sensor data representative of depth information within the environment or sensory field of the sensor 102B, and the bounding shape 306B may be computed using the D-RPN 114, for example. In the visualizations 302C-302D of FIG. 3B, the frustum 308B may extend from the four corners of the bounding shape 306B to a point on the sensor 102B, and the frustum 308B may thus define an area in 3D world-space (e.g., an area in the environment) that corresponds to the bounding shape 306B—as determined from the 2D image-space location of the bounding shape 306B.

Referring again to FIG. 1, the filter 134 may be used to filter out portions of depth data (e.g., 2D depth data, 3D depth data, etc.) generated by one or more depth sensors (e.g., one or more of the sensors 102). For example, the filter 134 may be used to filter out portions—e.g., points of a point cloud—of the sensor data that do not correspond to an area within the frustum. As a result, the voxelizer 124 may only voxelize the portions of the sensor data that are within the frustum which may significantly reduce compute resources, reduce latency, and also allow for more accurate and focused processing of depth information that actually corresponds to an object (and thus does not correspond to a background or surrounding feature of the environment).

As an example, and again with reference to FIG. 3A, a point cloud 304A may be generated by a depth sensor. The point cloud 304A may be generated by the sensor 102A or may be generated by a different sensor. For example, where the sensor 102A is a camera that generates an image used for computing the bounding shape 306A, the sensor that generates the point cloud 304A (or other depth information representation) may include a LIDAR sensor(s) 764, a RADAR sensor(s) 760, and/or another depth sensor type. Where the sensors are different, the points of the point cloud 304A that correspond to a field of view or sensor field of the sensor 102A may be determined using intrinsic and/or extrinsic parameters of the various sensors. For example, where fields of view and/or sensor fields of the sensor 102A and the depth sensor overlap, the portions of the sensor data generated by the depth sensor that overlap with the field of view or sensor fields of the sensor 102A may be analyzed by the filter 134 and/or the voxelizer 124. In any example, the points of the point cloud 304A may be generated by any number of depth sensors over any number of instances. For example, the sensor data from any number of depth sensors may be captured over a period of time and/or a number of instances (e.g., a current instance, a current instance and one or more prior instances, etc.), and the cumulative sensor data may be used to generate the point cloud 304A. In such an example, temporal smoothing (e.g., to weight a current instance of sensor data in view of a prior instance(s) of sensor data), filtering (e.g., of noisy or outlier points), and/or other techniques may be leveraged to generate a point cloud 304A that is representative of sensor data from one or more depth sensors over any period of time and/or sensor data instances.

As such, for illustrative purposes only, the visualization 302A includes some or all of the points of the point cloud 304A and the visualization 302B includes only the points of the point cloud 304A that are within the frustum 308A. For example, the filter 134 may have been applied to the sensor data representative of the point cloud 304A to determine the subset of the points that are within the frustum 308A. Similarly, with respect to FIG. 3B, and again for illustrative purposes only, the visualization 302C includes some or all of the points of the point cloud 304B and the visualization 302C includes only the points of the point cloud 304B that are within the frustum 308B. For example, the filter 134 may have been applied to the sensor data representative of the point cloud 304B to determine the subset of the points that are within the frustum 308B.

Referring again to FIG. 1, the voxelizer 124 may use the subset of the sensor data that remains after the filter 134 has filtered out the portions of the sensor data that do not correspond to an area within the frustum (and/or an area around the frustum, such as a certain radius outside of the area defined by the frustum, in embodiments). For example, the remaining subset of the sensor data—e.g., points of a point cloud—may be voxelized into a volume of a certain dimension (e.g., 32×32×64, 48×48×96, etc.). The voxelizer 124 may use any of a number of voxelization techniques including, but not limited to, uniform voxelization and/or masked voxelization. For example, X and Y coordinates for the voxels may be calculated using a calibrated camera matrix. The depth coordinate, Z, may be calculated as the distance from the sensor location. In some embodiments, the Z coordinate may be normalized by the maximum and/or minimum depths computed for the given volume. In at least one embodiment, outlier points or voxels corresponding thereto may be removed using one or more filters. For example, the outliers may be determined by calculating a mean and standard deviation of the Z coordinate and using a 90% confidence level. The result of the voxelization may be a volume comprising a plurality of voxels, where each voxel may correspond to a point from the filtered depth data.

Figure 3C:
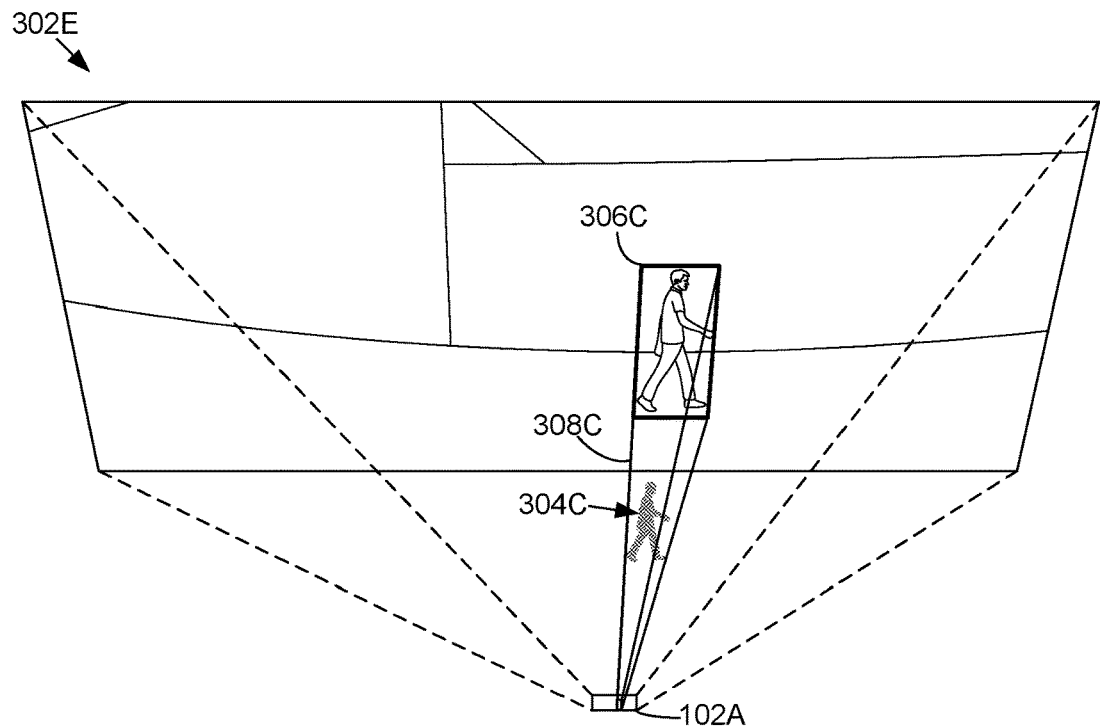
Figure 3D:
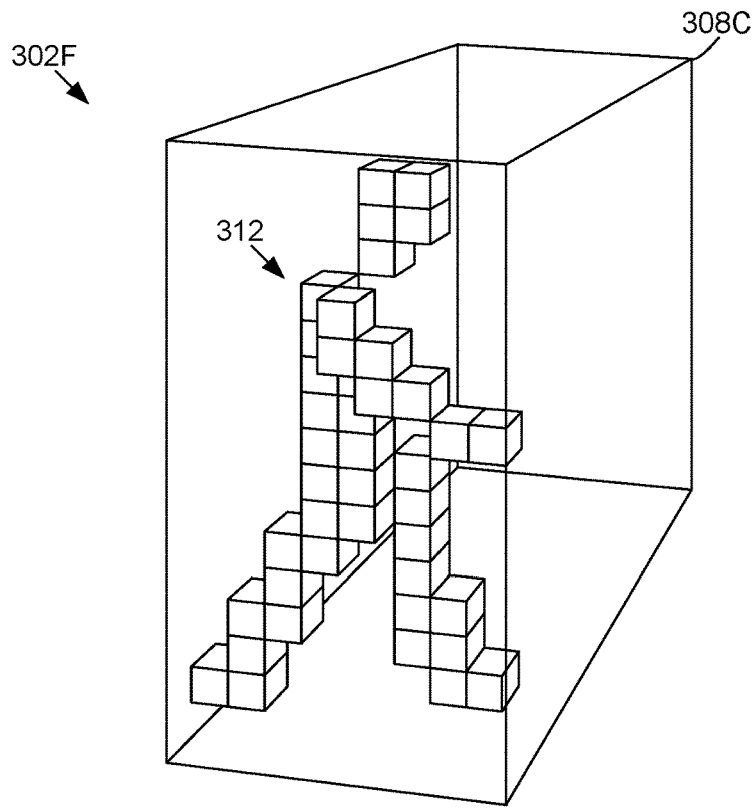
FIG. 3D is an example illustration of voxelizing the filtered 3D data of FIG. 3C, in accordance with some embodiments of the present disclosure.

As an illustrative example only, and with respect to FIGS. 3C and 3D, a frustum 308C may be generated to correspond to a bounding shape 306C—as illustrated in visualization 302E. The frustum 308C may be used to filter out points of a point cloud 304C (or other depth data representation). The remaining points of the point cloud 304C may be voxelized to generate a volume 312 of voxels (represented by cubes) within the frustum 308C—as illustrated in visualization 302F. The volume 312 may then be applied—in the form of a vector, tensor, or other data representation configured for input to the 3D CNN(s) 128—to the 3D CNN(s) 128, as described in more detail herein.

Referring again to FIG. 1, the outputs of the pre-processor 106 may be applied to the classifier 108. For example, the 2D data representation computed by the image extractor 120 may be applied to the 2D CNN(s) 126 and the 3D data representation computed by the voxelizer 124 may be applied to the 3D CNN(s) 128. The 2D ROI image vector or tensor may then be applied to one or more 2D convolutional layers of the 2D CNN(s) 126, and the output may be feature maps or feature representations. The output features maps or feature representations may be converted—e.g., flattened—to form a vector suitable for application to one or more future layers of a DNN (e.g., a fully connected layer(s) 130). Similarly, the 3D volume vector or tensor may be applied to one or more 3D convolutional layers of the 3D CNN(s) 128, and the output may be feature maps or feature representations. The output feature maps or feature representations may be converted—e.g., flattened—to form another vector suitable for application to one or more future layers of a DNN (e.g., the fully connected layer(s) 130). As such, both the data representing the ROI image and the data representing the voxelized volume may be applied to separate streams or layers within a larger DNN 136, and the outputs may be concatenated or otherwise combined and applied to one or more additional layers of the DNN 136 (e.g., a DNN that includes the 2D CNN(s) 126, the 3D CNN(s) 128, the fully connected layer(s) 130, and/or one or more additional layers)—such as, without limitation, the fully connected layer(s) 130.

The (flattened) vector output by the 2D CNN(s) 126 and the (flattened) vector output by the 3D CNN(s) 128 may be merged into a longer (flattened) vector and apply to the one or more additional layers of the DNN 136. For example, the longer vector may be applied to the fully connected layer(s) 130, and the fully connected layer(s) 130 may output confidences corresponding to one or more classes the DNN 136 is trained to predict. For example, the DNN 136 may output one-hot class outputs 132 corresponding to the various classes the DNN 136 is trained to predict.

In some instances, weighting may be implemented during training of the DNN 136 to give more weight to the outputs from the 2D CNN(s) 126 as compared to the outputs from the 3D CNN(s) 128, or vice versa. The benefit of having two or more sources or paths is that in certain situations, the outputs of one may be more accurate than the output of the other. For example, where two objects overlap (e.g., one person walking in front of the other from the perspective of the sensor 102), the 3D CNN(s) 128 may not be as accurate at predicting the class of the object furthest from the sensor 102—e.g., because the voxelated volume may primarily correspond to the to object closer to the sensor 102. In such an example, the DNN 136 may be trained to give more weight to the output from the 2D CNN(s) 126. In more common examples, such as where a single object is present—or where the 2D input source is occluded due to rain, snow, ice, etc., or is subject to blindness due to overexposure from the sun or excessive darkness—the DNN 136 may be trained to give more weight to the output from the 3D CNN(s) 128.

In some non-limiting examples, the DNN 136 may be trained using SoftMax cross entropy as a cost function and using an Adam optimizer for back-propagation. However, as described herein, this is not intended to be limiting, and other cost functions and/or optimizers may be used, including, but not limited to, those described herein.

Where the system 100 is for object detection and classification by the vehicle 700, the classes may include, without limitation, vehicles, pedestrians, and animals, or may include more granular classes such as SUVs, sedans, busses, bicyclists, adults, children, dogs, cats, horses, etc. Where the system 100 is for object detection and classification by a robot, the classes may include, without limitation, pedestrians, other robots, vehicles, etc. Where the system 100 is for object detection and classification by an aircraft or drone, the classes may include aircraft, drones, birds, buildings, vehicles, pedestrians, etc. As such, depending on the implementation of the system 100, the classes that the DNN 136 is trained to predict may vary.

As described herein, the generation of frustums to filter out portions of the sensor data corresponding to depth information allows for reductions in compute resources, latency and run-time of the system 100 as compared to point-based or multi-view pixel-based approaches, while simultaneously increasing the accuracy of the predictions. For example, by leveraging the ROI proposals from 2D image-space, the initial detection of objects is expedited as compared to methods that rely on 3D data for detection and classification. In addition, by filtering out the 3D points that are not within the frustum, the amount of data that needs to be voxelized and processed by the DNN 136 is significantly reduced—thereby resulting in an overall object detection and classification process within the system 100 that is capable of real-time or near real-time deployment in safety critical applications, such as autonomous driving. Further, by leveraging graphics processing units (GPUs)—such as those described herein with respect to FIGS. 7A-7D and FIG. 8—and/or associated acceleration algorithms, the processing within the system 100 may be further streamlined and optimized for real-time or near real-time deployment.

As such, during design, testing, and validation of the system 100, various approaches were considered. For example, FIGS. 4A-4C depict example network architectures 400A-400C for performing object detection using varying types of input data—e.g., 3D points 402, 2D images 404, 3D voxels 406, etc.—that were experimented with during development of the system 100. Additionally, FIGS. 5A-5C include charts corresponding to performance characteristics of the network architectures of FIGS. 4A-4C, respectively. For example, charts 500A-500C correspond to training time, charts 502A-502C correspond to validation accuracy, and charts 504A-504C correspond to convergence. As such, as can be seen from the charts in FIGS. 5A-5C, the accuracy is greater when using 3D voxels 406 over 3D points 402, and the convergence is faster—e.g., less iterations of training—when using 3D voxels 406 over 3D points 402. The 2D images 404 may not yield as accurate of results, but is being used as secondary—less processing intensive—source of object detection and classification. The difference between 3D voxels 406 and 3D points 402, especially with respect to accuracy and convergence, is valuable because not only is the accuracy and convergence greater for 3D voxels 406, but the processing times and compute resources for 3D voxels 406 are also less than for 3D points 402, as described herein. As such, not only does the system 100 using 3D voxels 406 perform more accurately, the system 100 also performs more efficiently.

In some non-limiting embodiments, the network architecture 400B may correspond to the 2D CNN(s) 126 and the network architecture 400C may correspond to the 3D CNN(s) 128, while the illustrated fully connected (FC) layer(s) may correspond to the fully connected layer(s) 130 of the DNN 136.

Figure 6:
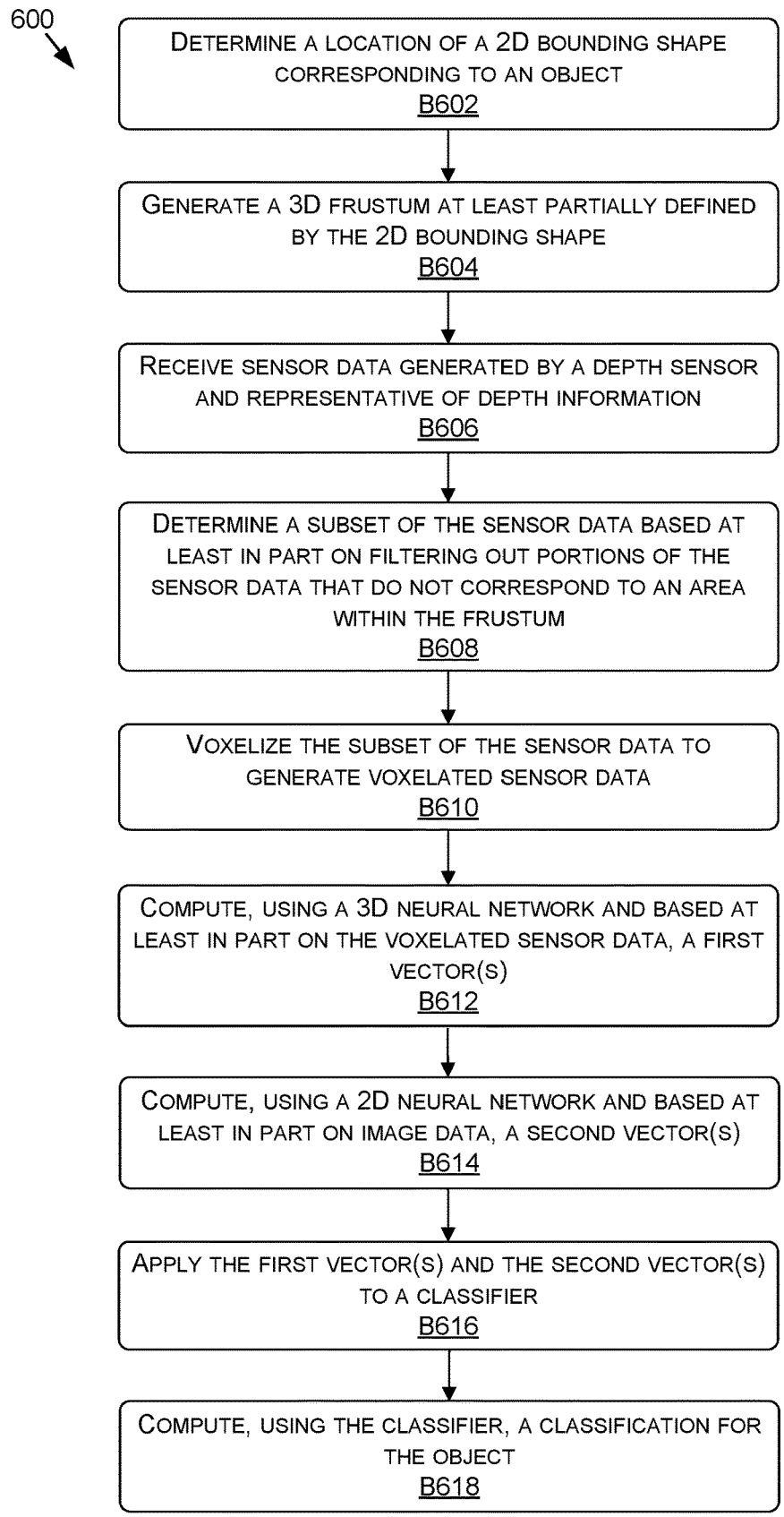
FIG. 6 depicts a flow diagram showing a method for performing object detection using multidimensional data, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the system of FIG. 1. However, the method 600 may additionally or alternatively be executed by any one system, or any combination of systems, including, but not limited to, those described herein.

FIG. 6 depicts a flow diagram showing a method 600 for performing object detection using multidimensional data, in accordance with some embodiments of the present disclosure. The method 600, at block B602, includes determining a location of a 2D bounding shape corresponding to an object. For example, the ROI determiner 104 may compute the final ROI 118, where the final ROI 118 may be determined based at least in part on the ROI 116A, the ROI 116B, and/or another ROI.

The method 600, at block B604, includes generating a 3D frustum at last partially defined by the 2D bounding shape. For example, the frustum generator 122 of the pre-processor 106 may generate a frustum corresponding to the final ROI 118.

The method 600, at block B606, includes receiving sensor data generated by a depth sensor and representative of depth information. For example, a depth sensor of the sensors 102 may generate sensor data representative of depth information—such a point cloud or RADAR tracks.

The method 600, at block B608, includes determining a subset of the sensor data base at least in part on filtering out portions of the sensor data that do not correspond to an area within the frustum. For example, the filter 134 of the pre-processor 106 may filter out portions of the depth information that does not correspond to the area within the frustum.

The method 600, at block B610, includes voxelizing the subset of the sensor data to generate voxelated sensor data. For example, the voxelizer 124 of the pre-processor 106 may voxelize the portion of the sensor data that corresponds to the area within the frustum—e.g., to generate a volume.

The method 600, at block B612, includes computing, using a 3D neural network and based at least in part on the voxelated sensor data, a first vector(s). For example, the 3D CNN(s) 128 may generate an output feature map or feature representation based at least in part on the voxelated sensor data (e.g., the input vector or tensor representing the volume formed by the voxels), and the feature map or feature representation may be converted to a vector.

The method 600, at block B614, includes computing, using a 2D neural network and based at least in part on image data, a second vector(s). For example, the 2D CNN(s) 126 may generate an output feature map or feature representation based at least in part on the image data (e.g., image data representative of an ROI image as determined from an image and/or from a depth map), and the feature map or feature representation may be converted to a vector.

The method 600, at block B616, includes applying the first vector(s) and the second vector(s) to a classifier. For example, the classifier 108 may use the fully connected layer(s) 130 and/or other layers of the DNN 136 to process the vector from the 2D CNN(s) 126 and the vector from the 3D CNN(s) 128.

The method 600, at block B618, includes computing, using the classifier, a classification for the object. For example, the classifier 108—e.g., the DNN 136—may compute confidences corresponding classifications for the object (e.g., as the one-hot class output 132).

Example Machine Learning Models

Although examples are described herein with respect to using DNNs, and specifically CNNs, as the LR-RPN 112, the D-RPN 114, the 2D CNN(s) 126, the 3D CNN(s) 128, and the DNN 136, this is not intended to be limiting. For example, and without limitation, the DNNs described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In addition, in some embodiments, the DNNs described herein may include a convolutional layer structure, including layers such as those described herein. For example, the DNNs may include a full architecture formulated for the task of generating various outputs—such as ROIs 116A, 116B, etc., vectors corresponding to voxelized sensor data or ROI images, classification confidences, etc. Where a CNN is implemented, one or more of the layers may include an input layer. The input layer may hold values associated with the input (e.g., vectors, tensors, etc. corresponding to sensor data, voxelized sensor data, feature vectors, etc.). For example, when the sensor data is an image(s), the input layer may hold values representative of the raw pixel values of the image(s) as a volume (e.g., a width, W, a height, H, and color channels, C (e.g., RGB), such as 32×32×3), and/or a batch size, B (e.g., where batching is used)

One or more layers of the DNNs may include 2D and/or 3D convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the DNNs may not include any pooling layers. In such examples, strided convolution layers may be used in place of pooling layers. In some examples, the feature extractor layer(s) 126 may include alternating convolutional layers and pooling layers.

One or more of the layers may include a fully connected layer. Each neuron in the fully connected layer(s) may be connected to each of the neurons in the previous volume. The fully connected layer may compute class scores, and the resulting volume may be 1×1×number of classes. In some example, no fully connected layers may be used by the DNNs as a whole, in an effort to increase processing times and reduce computing resource requirements. In such examples, where no fully connected layers are used, the DNNs may be referred to as a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input vector or tensor of the DNN, or used to up-sample to the input spatial resolution of a next layer.

Although input layers, convolutional layers, pooling layers, ReLU layers, deconvolutional layers, and fully connected layers are discussed herein with respect to the DNN, this is not intended to be limiting. For example, additional or alternative layers may be used, such as normalization layers, SoftMax layers, and/or other layer types.

Different orders and numbers of the layers of the DNNs may be used depending on the embodiment. In addition, some of the layers may include parameters (e.g., weights and/or biases), while others may not, such as the ReLU layers and pooling layers, for example. In some examples, the parameters may be learned by the DNNs during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Example Autonomous Vehicle

Figure 7A:
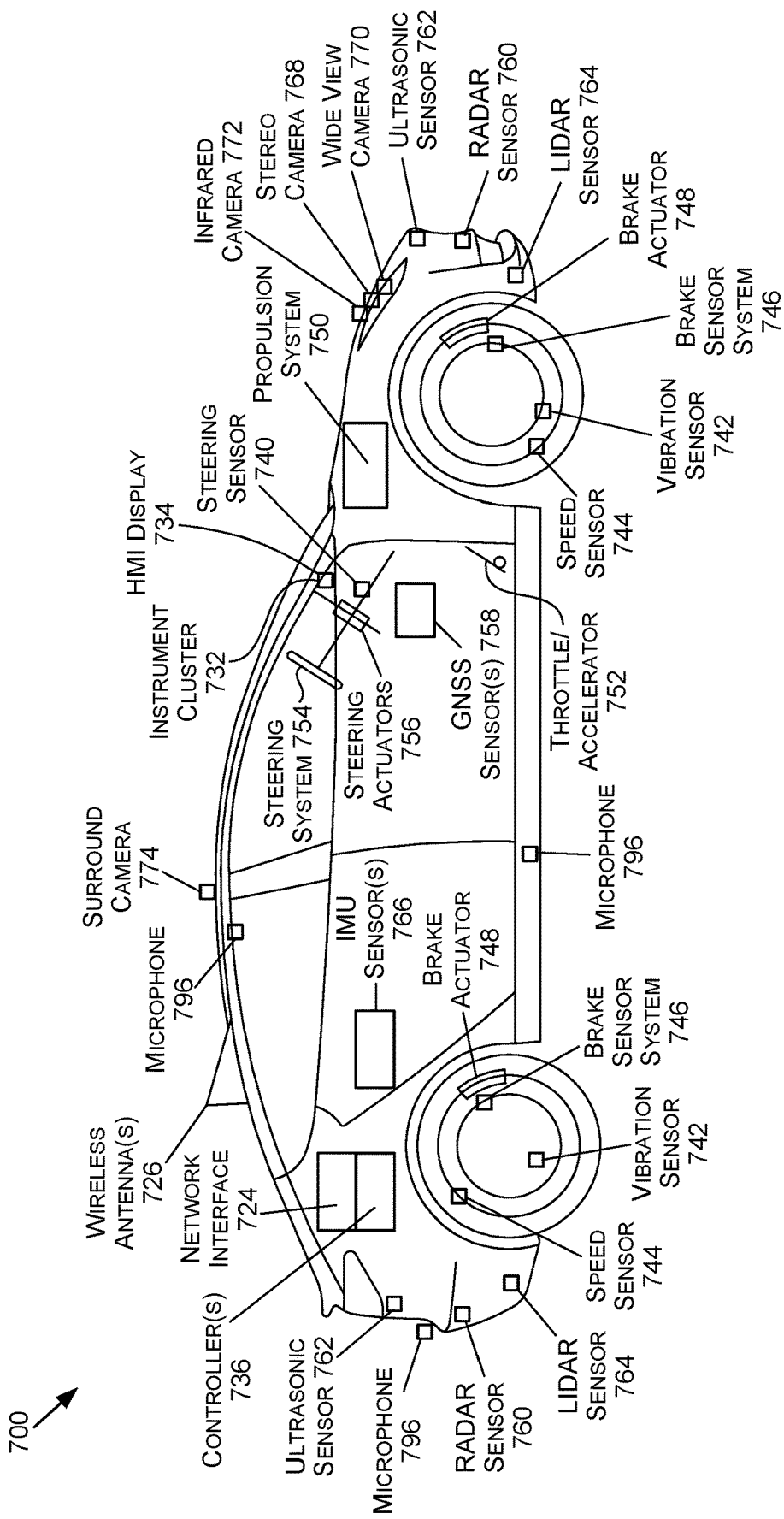
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
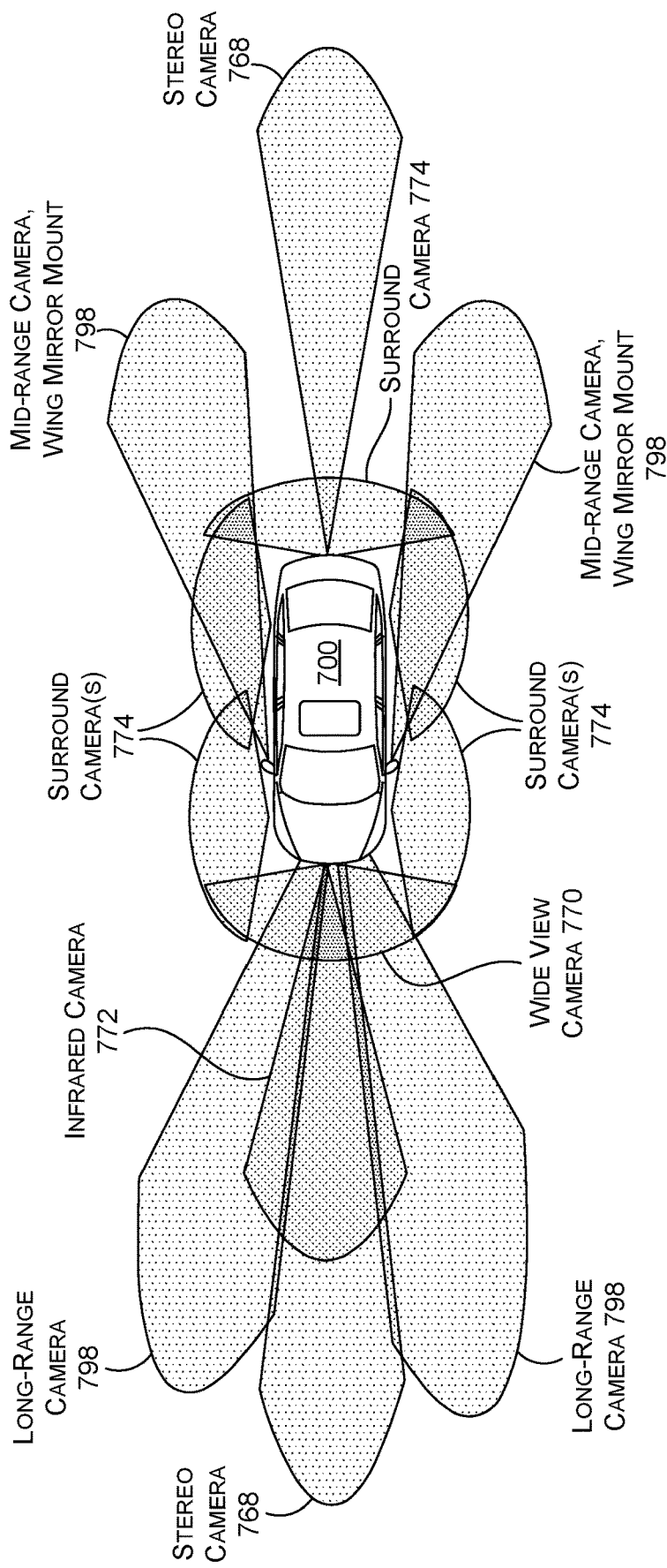
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
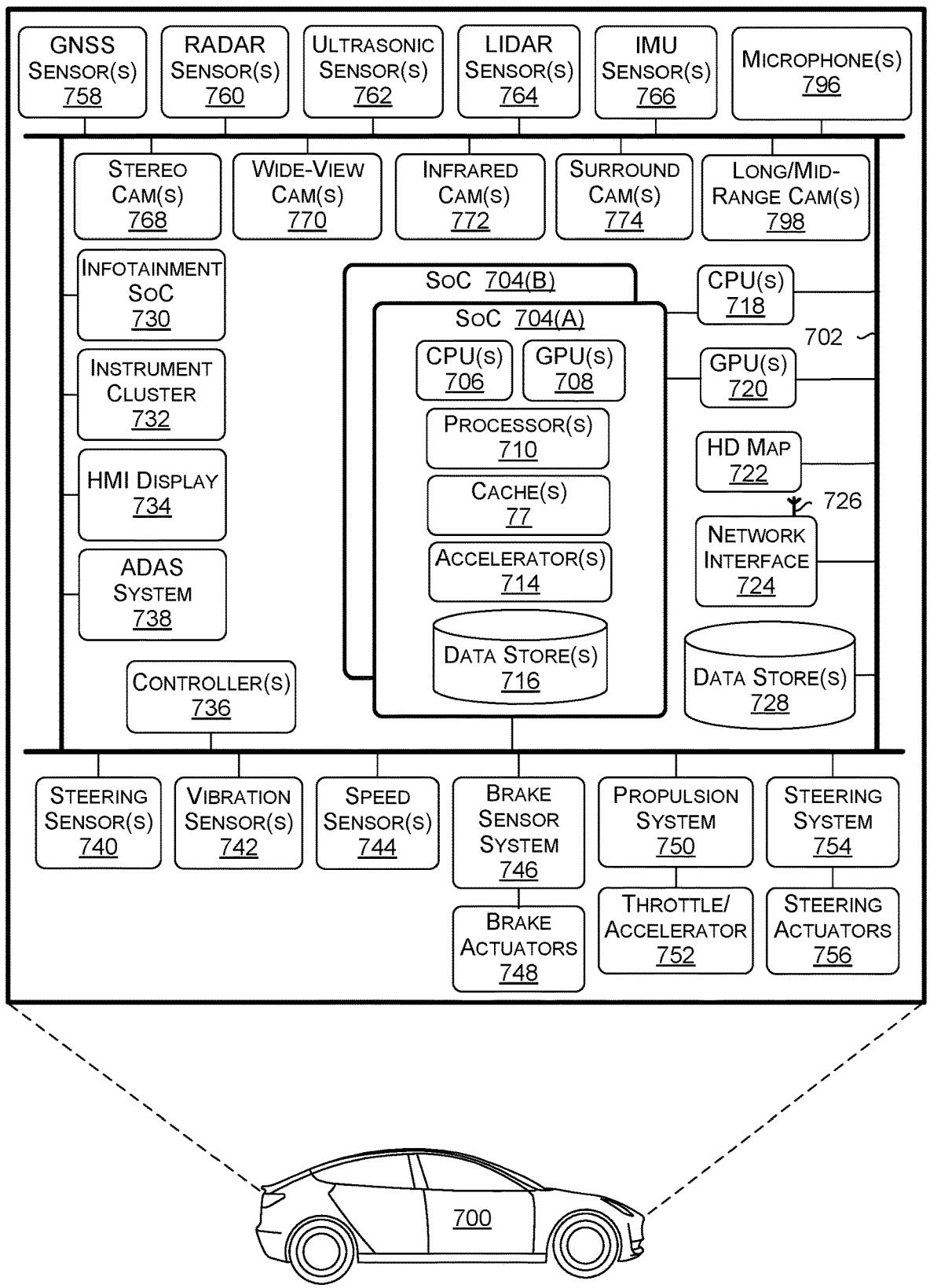
FIG. 7C depicts a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing.

The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multidimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
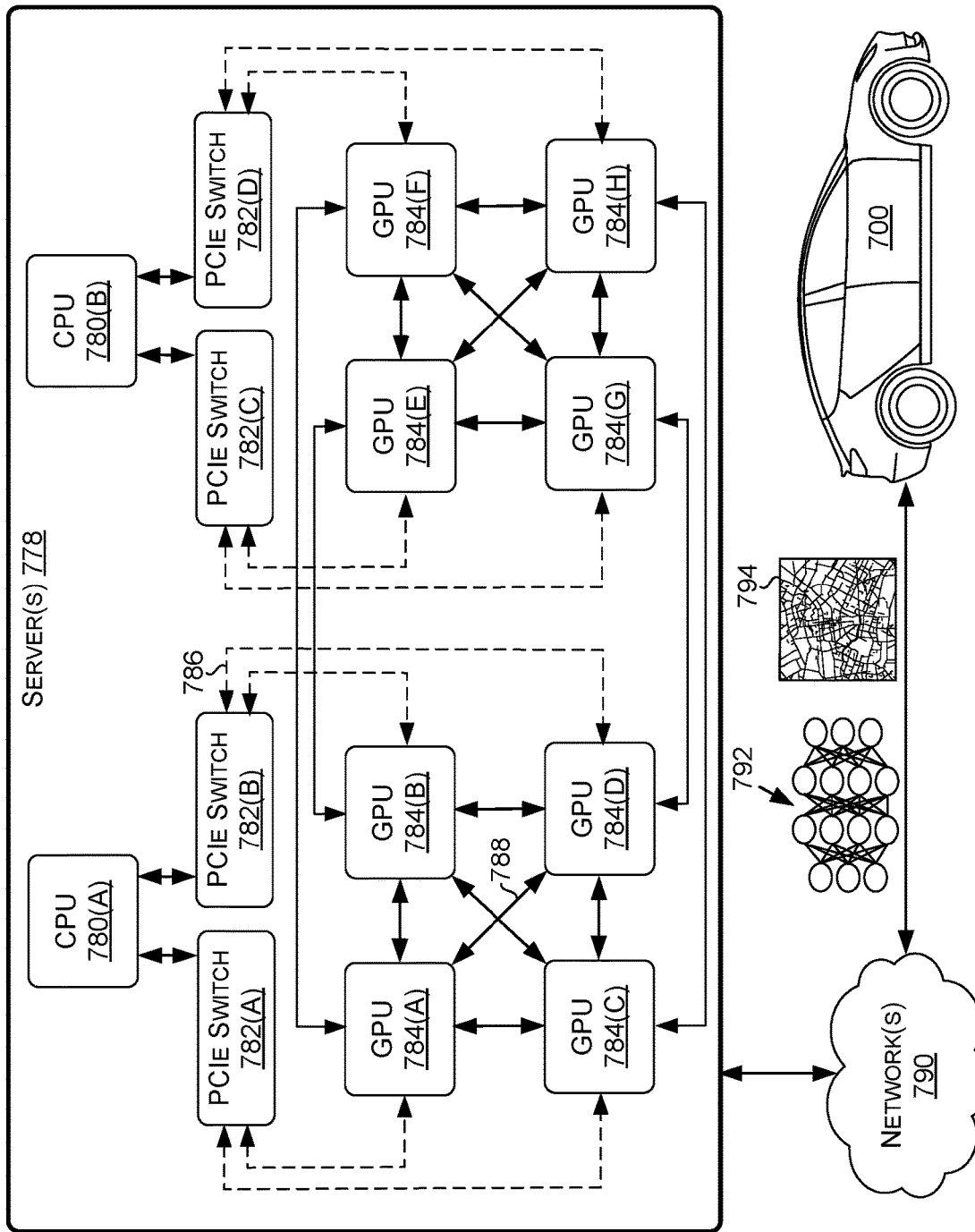
FIG. 7D depicts a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
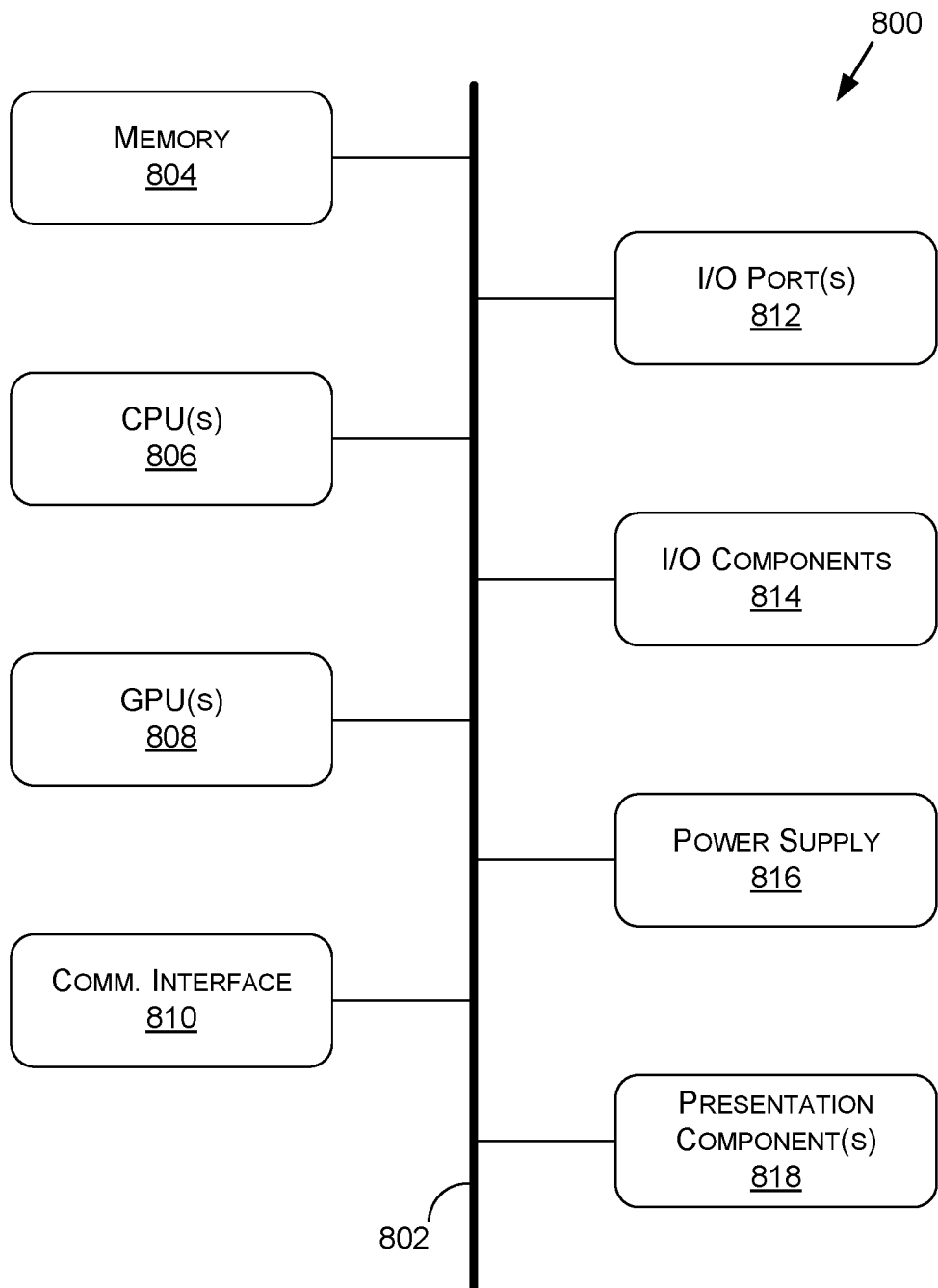
FIG. 8 depicts a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining, based at least on image data generated using one or more cameras of a machine, a two-dimensional (2D) bounding shape associated with an object;
    determining, based at least on the 2D bounding shape and sensor data generated using one or more depth sensor of the machine, at least a portion of the sensor data corresponding to the 2D bounding shape, the sensor data corresponding to a three-dimensional (3D) environment;
    converting at least the portion of the sensor data from a first format to a second format to generate updated sensor data; and
    determining, using one or more neural networks and based at least on the updated sensor data, a classification associated with the object.

2. The method of claim 1, wherein the determining the 2D bounding shape associated with the object comprises:
    determining, using an additional neural network, that a portion of an image represented by the image data depicts the object; and
    determining, based at least on the portion of the image, the 2D bounding shape.

3. The method of claim 2, wherein the determining of the classification associated with the object is further based at least on the image data.

4. The method of claim 1, wherein the determining the classification comprises:
    generating, using a first neural network of the one or more neural networks and based at least on the updated sensor data, a first output; and
    generating, using a second neural network of the one or more neural networks and based at least on the first output, a second output,
    wherein the second output is indicative of the classification associated with the object.

5. The method of claim 4, wherein the determining the classification associated with the object is further based at least on a first weight associated with the first output and a second weight associated with the second output.

6. The method of claim 1, further comprising:
    determining, using an additional neural network and based at least on the image data, an additional classification associated with the object; and
    determining a final classification associated with the object based at least on the classification and the additional classification.

7. The method of claim 1, wherein the determining the portion of the sensor data comprises:
    translating the 2D bounding shape to the 3D environment to determine a 3D bounding shape; and
    determining, based at least on the 3D bounding shape, the portion of the sensor data.

8. The method of claim 1, further comprising:
    converting the sensor data from the 3D environment to 2D image-space to generate a depth map; and
    determining, based at least on the 2D bounding shape and the depth map, an additional bounding shape associated with the object,
    wherein the determining the portion of the sensor data is further based at least on the additional bounding shape.

9. The method of claim 1, wherein the first format corresponds to a point cloud representation and the second format corresponds to a voxelized representation.

10. The method of claim 1, wherein the determining the portion of the sensor data corresponding to the 2D bounding shape:
    converting the 2D bounding shape to world-space to generate a second bounding shape in the world-space; and determining, based at on the second bounding shape, the portion of the sensor data as the sensor data that is associated with the second bounding shape.

11. A system comprising:
one or more processing units to:
determine a first bounding shape in image-space associated with an object;
convert the first bounding shape to world-space to generate a second bounding shape in the world-space;
determining, based at least on the second bounding shape, a portion of depth data that is within the second bounding shape;
generating a three-dimensional (3D) representation of the portion of the depth data; and
determine, using one or more neural networks and based at least on the 3D representation, a classification associated with the object.

12. The system of claim 11, wherein the bounding shape associated with the object is determined, at least in part, by:
determining, using an additional neural network, that a portion of an image represented by image data depicts the object; and
determining, based at least on the portion of the image, the bounding shape.

13. The system of claim 11, wherein the 3D representation includes a voxelized representation.

14. The system of claim 11, wherein the classification associated with the object is determined, at least in part, by:
generating, using a first neural network of the one or more neural networks and based at least on the 3D representation, a first output;
generate, using a second neural network of the one or more neural networks and based at least on the first output, a second output; and
determining the classification based at least on the second output.

15. The system of claim 14, wherein the classification associated with the object is determined based at least on a first weight associated with the first output and a second weight associated with the second output.

16. The system of claim 11, wherein the one or more processing units are further to:
convert the depth data from the world-space to the image-space to generate a depth map; and
determine, based at least on the first bounding shape and the depth map, a third bounding shape associated with the object,
wherein the portion of the depth data is further determined based at least on the third bounding shape.

17. The system of claim 11, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using a robot;
a system for performing conversational AI operations; or
a system implemented at least partially using cloud computing resources.

18. The system of claim 11, wherein the one or more processing units are further to:
generate, using an additional neural network and based at least on image data, an additional classification associated with the object; and
determine a final classification associated with the object based at least on the classification and the additional classification.

19. A processor comprising:
one or more processing units to:
determine a first bounding shape in image-space associated with an object;
convert a depth data from world-space to the image-space to generate a depth map;
determine, based at least on the first bounding shape and the depth map, a second bounding shape associated with the object;
determining, based at least on the second bounding shape, a portion of the depth data that is within the second bounding shape;
generating a three-dimensional (3D) representation of the portion of the depth data; and
classify the object based at least on one or more neural networks processing data corresponding to the 3D representation.

20. The processor of claim 19, wherein the processor is comprised in at least one of:
a control system for an autonomous or semi-autonomous machine;
a perception system for an autonomous or semi-autonomous machine;
a system for performing simulation operations;
a system for performing deep learning operations;
a system implemented using a robot;
a system for performing conversational AI operations; or
a system implemented at least partially using cloud computing resources.

* * * * *